United States Patent Office 2,724,714
Patented Nov. 22, 1955

2,724,714

2 METHYL-3 ACETYL-4,5 PYRIDINE DICARBOXYLIC ACID, LOWER ALKYL ESTERS THEREOF AND INTERMEDIATES

Reuben G. Jones, Indianapolis, Ind., assignor to Eli Lilly and Company, Indianapolis, Ind., a corporation of Indiana No Drawing. Application April 29, 1954,
Serial No. 426,564

15 Claims. (Cl. 260—295.5)

This is a continuation of my co-pending applications Serial No. 216,085 filed March 16, 1951, and Serial Nos. 376,247, 376,248 and 376,249 filed August 24, 1953, all of which are now abandoned.

This invention relates to novel organic compounds and their preparation. More particularly, this invention relates to compounds useful in the synthesis of pyridoxine, and to the syntheses thereof.

The compounds of this invention and the methods of their preparation are illustrated by the following equations. In the formulas below, R and $R_1$ in each instance represent the same or different lower alkyl radical, $R_2$ represents hydrogen or a lower alkyl radical, and M represents an alkali metal.

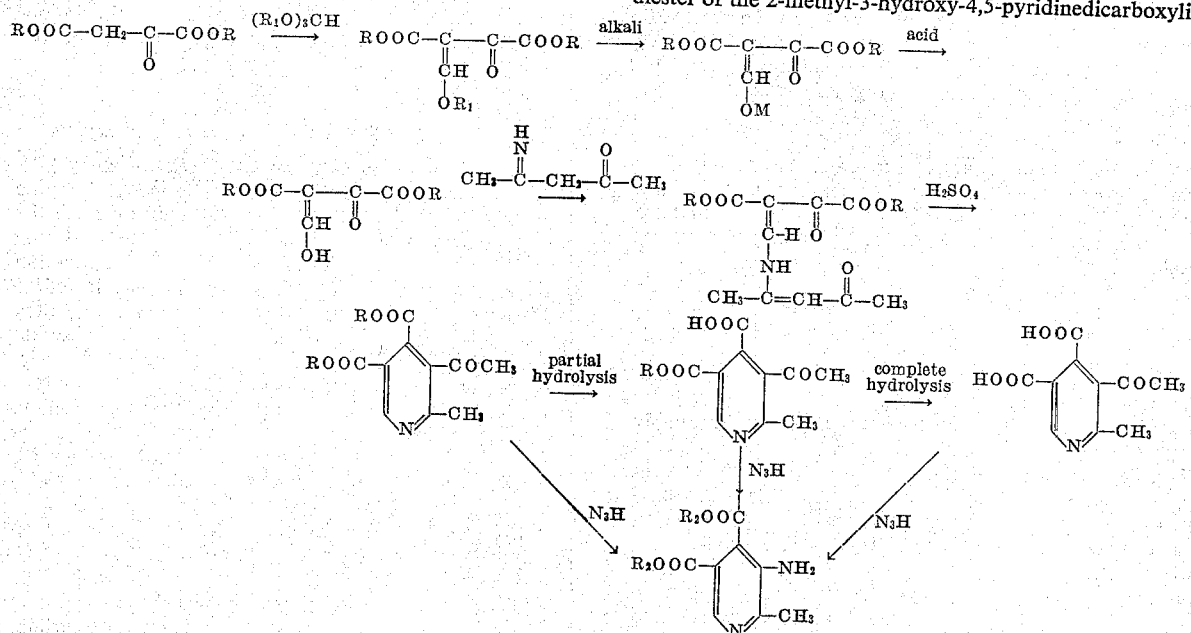

boxy-3'-keto-1'-propenyl) amine ester. In the latter reaction, the acetylacetone reacts with the ammonium salt to form in situ iminoacetylacetone which then condenses with the oxalacetic acid ester compound.

The pyridine diester can be partially or completely hydrolyzed to form the corresponding monoacid-ester and diacid compounds, and in fact, under the preferred conditions of effecting the cyclization, is in part hydrolyzed to at least the monoacid ester. In any of the last three mentioned compounds, i. e., the monoacid ester, the diester and the dicarboxylic acid or a mixture of two or more of them, the acetyl group at the 3-position of the pyridine ring is converted to an amino group by treatment with hydrazoic acid to yield, as the case may be, the amine compound of the corresponding monoacid ester, the diester or the dicarboxylic acid.

Although the acid-ester can be isolated and treated with hydrazoic acid, or isolated and esterified or hydrolyzed as noted above, the preferred practice is to treat the sulfuric acid-containing cyclization reaction mixture with hydrazoic acid, or preferably with a metal azide to form hydrazoic acid in situ, and thus effect the amination of the compound without the necessity of isolating the acetylpyridine compound.

The carboxylated aminopyridine compounds can be converted to pyridoxine by converting the amino group into a hydroxyl group with nitrous acid, and reducing a diester of the 2-methyl-3-hydroxy-4,5-pyridinedicarboxylic acid with lithium aluminum hydride by the procedure set forth in British Patent No. 629,450.

In the specific examples to follow, for illustrative purposes, the ethyl ester is employed exclusively. However, this invention is not limited to the use of the ethyl radical as an esterifying group but also includes other lower alkyl radicals, i. e., radicals having from 1 to 6 carbon atoms, and equivalents thereof. It will be obvious to those skilled in the art that the esterifying groups employed should not contain interfering functional groups which would prevent the desired reaction from taking place. Of esterifying radicals, it can be said that the most suitable radicals are the lower alkyl radicals because of their availability, but illustrative examples of compounds employing other esterfying radicals which are suitable for the purposes of this invention include β-methoxyethyl ethoxymethyleneoxalacetate, benzyl hydroxymethyleneoxalacetate, amyl hydroxymethyleneoxal- As will be seen from the above equations, this invention comprises the following compounds and process steps: An ester of oxalacetic acid is reacted with an orthoformic acid alkyl ester preferably in the presence of an amount of a lower aliphatic acid anhydride, to produce an ester of an etherified hydroxymethyleneoxalacetic acid. The ether is hydrolyzed with alkali solution and subsequently is treated with acid to yield an ester of hydroxymethyleneoxalacetic acid. Reaction of the hydroxy compound with iminoacetylacetone yields a N-(1-methyl-3-keto-1-butenyl)-N - (2',3' - dicarboxy - 3'-keto-1'-propenyl) amine ester, which is cyclized with sulfuric acid to form a pyridine compound, namely, a 2-methyl-3-acetyl-4,5-pyridinedicarboxylic acid ester. Instead of employing iminoacetylacetone with the hydroxymethyleneoxalacetic ester, the ammonium salt of the latter compound can be reacted with acetylacetone to form the N-(1-methyl-3-keto-1-butenyl)-N-(2',3'-dicaracetate, 2-methyl-3-acetyl-5-carbopropoxy-4-pyridine carboxylic acid, 2-methyl-3-acetyl-5-carbophenoxy-4-pyridinecarboxylic acid, dibutyl 2-methyl-3-acetyl-4,5-pyridinedicarboxylate, and the like. The above-listed analogous and homologous compounds are prepared by methods equivalent to those set forth in the following examples.

In preparing a specific alkyl alkoxymethyleneoxalacetate, it is desirable to employ the same esterifying group in both the oxalacetate ester and the orthoformate ester to avoid the possibility of ester interchange and the formation of mixed esters. The same considerations apply to the esterification of a 2-methyl-3-acetyl-5-carbalkoxy-4-pyridinecarboxylic acid in the production of esters of 2-methyl-3-acetyl-4,5-pyridinedicarboxylic acids.

This invention is further illustrated by the following specific examples.

EXAMPLE 1

Ethyl ethoxymethyleneoxalacetate 188 g. (1.0 mol) of ethyl oxalacetate, 260 g. (1.75 mol) of ethyl orthoformate and 290 g. (2.84 mol) of acetic anhydride were mixed in a flask and the mixture was heated in a wax bath at 120 C. for one hour. The temperature of the bath was then raised to 140° C. for about two hours and the volatile products of the reaction were allowed to distill off. The residue was distilled in vacuo, and the fraction boiling at about 163–165° C. at a pressure of 2 mm. of mercury, was collected. 220 g. (90 percent of theory) of distillate comprising ethyl ethoxymethyleneoxalacetate were obtained. Analysis showed the presence of 54.06 percent carbon and 6.63 percent hydrogen as compared with the calculated values of 54.09 percent carbon and 6.60 percent hydrogen. The refractive index and density were as follows:

$$n_D^{25} = 1.4732;\ d_{25} = 1.1375$$

With equivalent amounts of methyl, propyl, butyl or benzyl oxalacetate and ethyl or similar alkyl orthoformate, the above procedure is employed to prepare the methyl, propyl, butyl and benzyl alkoxymethyleneoxalacetates.

EXAMPLE 2

Ethyl hydroxymethyleneoxalacetate

To a saturated aqueous solution of 50 g. of sodium bicarbonate were added 122 g. (0.5 mol) of ethyl ethoxymethyleneoxalacetate and the mixture was thoroughly agitated. The oxalacetate dissolved with the evolution of carbon dioxide. The clear solution was acidified with a slight excess of hydrochloric acid, and ethyl hydroxymethyleneoxalacetate separated as an oily layer. The oil was separated and the aqueous layer was extracted with several 100 ml. portions of ether to extract the small amount of ethyl hydroxyethyleneoxalacetate dissolved in the water. The ether extracts were combined, were dried over magnesium sulfate and evaporated in vacuo. The residue of ethyl hydroxymethyleneoxalacetate was combined with that previously separated and was purified by fractional distillation in vacuo. Ethyl hydroxymethyleneoxalacetate boiled at about 103–105° C. at a pressure of 2 mm. of mercury, and was obtained in a yield of 97 g. (90 percent of theoretical). Analysis showed the presence of 49.91 percent carbon and 5.77 percent hydrogen as compared with the calculated values of 50.0 percent carbon and 5.60 percent hydrogen. The refractive index and density were as follows: $n_D^{25}=1.4673$; $d_{25}=1.190$.

The hydrolytic procedure for splitting the ethyl ether linkage employed in the above example can also be used to split other alkoxyethers, e. g., the methyl, propyl, and amyl ethers of esters of hydroxymethyleneoxalacetic acid, such as for example, the methyl, hexyl and benzyl esters to yield the corresponding esters of the hydroxymethylene compound.

EXAMPLE 3

N-(1-ethyl-3-keto-1-butenyl)-N-(2',3'-dicarbethoxy 3'-keto-1'-propenyl) amine 43 g. (0.2 mol) of ethyl hydroxymethyleneoxalacetate were dissolved in 200 ml. of dry ether and to the solution were added 25 g. (0.25 mol) of iminoacetylacetone. The mixture was maintained at room temperature for about 12 hours during which time there formed a precipitate, comprising a mixture of N-(1-methyl-3-keto-1-butenyl) - N - (2',3' - dicarbethoxy - 3' - keto - 1' - propenyl) amine and the ammonium salt of ethyl hydroxymethyleneoxalacetate. 200 ml. of ethyl acetate was added, and the mixture was warmed to dissolve the N-(1 - methyl - 3 - keto - 1 - butenyl) - N - (2',3' - dicarbethoxy-3'-keto-1'-propenyl) amine and the solution was filtered. The filtrate was evaporated in vacuo, leaving a syrupy residue which soon crystallized. The crystalline residue, comprising N - (1 - methyl - 3 - keto - 1 - butenyl) - N - (2',3' - dicarbethoxy - 3' - keto - 1' - propenyl)-amine, was purified by suspending it in 200 ml. of a mixture of equal parts of ether and petroleum ether and filtering the suspension. 34.5 g. (58 percent of theoretical) of N - (1 - methyl - 3 - keto - 1 - butenyl) - N - (2',3' - dicarbethoxy - 3' - keto - 1' - propenyl) amine melting at about 119–120° C. were obtained. Analysis showed the presence of 56.56 percent carbon, 6.50 percent hydrogen, and 4.63 percent nitrogen, as compared with the calculated values of 56.56 percent carbon, 6.44 percent hydrogen and 4.71 percent nitrogen.

In place of ethyl hydroxymethyleneoxalacetate, other esters of hydroxymethyleneoxalacetic acid, such as those enumerated in Example 2 can be condensed with iminoacetylacetone to yield, as the case may be, the methyl, hexyl or benzyl ester.

EXAMPLE 4

Diethyl-2-methyl-3-acetyl-4,5-pyridinedicarboxylate 15 g. (0.05 mol) of N-(1-methyl-3-keto-1-butenyl)-N-(2',3' - dicarbethoxy - 3' - keto - 1' - propenyl) amine were mixed with 25 ml. of 97 percent sulfuric acid, the mixture being maintained at about 50–60° C. during the addition by cooling in an ice bath. On completion of the exothermic reaction, the solution was allowed to stand at room temperature for 2 hours, and was then poured slowly with stirring into 100 ml. of cold absolute ethanol, and the alcohol solution was poured with stirring over 300 g. of chipped ice. The aqueous mixture was extracted with two 100 cc. portions of ethyl acetate, the extracts were combined, were washed with aqueous sodium bicarbonate solution, were dried over anhydrous magnesium sulfate, and were evaporated in vacuo yielding as an oil, diethyl 2-methyl-3-acetyl-4,5-pyridinedicarboxylate. The oil was fractionally distilled under reduced pressure, and the fraction boiling at 147–148° C. at a pressure of 1 mm. of mercury was collected. The diethyl-2-methyl-3-acetyl-4,5-pyridinedicarboxylate upon analysis showed the presence of 60.07 percent of carbon, 6.82 percent of hydrogen, and 5.09 percent of nitrogen, as compared with the calculated amounts of 60.20 percent carbon, 6.12 percent hydrogen, and 5.02 percent nitrogen. The refractive index and density were as follows: $n_D^{25}=1.5040$;

$$d_{25}^{25}=1.164$$

In the same manner, starting with the appropriate ester are prepared the dimethyl, dipropyl, dibenzyl, diphenyl and dibutyl esters of 2-methyl-3-acetyl-4,5-pyridinedicarboxylic acid.

EXAMPLE 5

2-methyl-3-acetyl-5-carbethoxy-4-pyridinecarboxylic acid

The procedure of Example 4 was followed to effect cyclization, using 30 g. (0.10 mol) of N-(1-methyl-3-keto-1-butenyl)-N-(2',3'-dicarbethoxy - 3' - keto-1'-propenyl)

amine and 50 ml. of 97 percent sulfuric acid. The sulfuric acid-containing reaction mixture instead of being poured into alcohol, was poured over chipped ice thus causing a partial hydrolysis of the 2-methyl-3-acetyl-4,5-pyridinedicarboxylic acid ester to the mono-acidester compound. The 2-methyl-3-acetyl-5-carbethoxy-4-pyridinecarboxylic acid was isolated from the aqueous mixture by partially neutralizing the mixture with 70 g. of sodium carbonate monohydrate, and extracting it with three 200 ml. portions of ethyl acetate. The ethyl acetate extracts were combined and washed with 200 ml. of water, and extracted with a solution of 30 g. of sodium bicarbonate in 500 ml. of water. The sodium bicarbonate extract, containing the sodium salt of the 2-methyl-3-acetyl-5-carbethoxy-4-pyridinecarboxylic acid formed in the reaction, was acidified with a slight excess of hydrochloric acid, and the acidified solution was extracted with three 100 ml. portions of ethyl acetate. The ethyl acetate extracts were combined and were dried over anhydrous magnesium sulfate, and evaporated to dryness in vacuo. 2-methyl-3-acetyl-5-carbethoxy-4-pyridinecarboxylic acid was obtained as a syrup which soon crystallized. It was purified by recrystallization from benzene-petroleum ether mixture. The 2-methyl-3-acetyl-5-carbethoxy-4-pyridinecarboxylic acid was obtained in a yield of 20 g. (80 percent of theoretical). It melted at about 138–139° C. Analysis showed the presence of 57.18 percent carbon, 5.42 percent hydrogen, and 5.76 per cent nitrogen, as compared with the calculated values of 57.37 percent carbon, 5.21 percent hydrogen and 5.58 percent nitrogen.

EXAMPLE 6

2-methyl-3-acetyl-4,5-pyridinedicarboxylic acid 10.0 g. of 2-methyl-3-acetyl-5-carbethoxy-4-pyridinecarboxylic acid were dissolved in 25 cc. of dilute aqueous sodium hydroxide, and the solution was warmed. The warm solution was acidified with hydrochloric acid, and a crystalline precipitate of 2-methyl-3-acetyl-4,5-pyridinedicarboxylic acid separated. The precipitate was filtered off, washed with water and dried. The 2-methyl-3-acetyl-4,5-pyridine dicarboxylic acid melted at about 230–232° C. (dec). Analysis showed the presence of 53.80 percent carbon, 4.19 percent hydrogen, and 6.09 percent nitrogen, as compared with the calculated values of 53.81 percent carbon, 4.07 percent hydrogen and 6.28 percent nitrogen.

EXAMPLE 7

2-methyl-3-amino-4,5-pyridinedicarboxylic acid

To a mixture of 2.5 g. (0.01 mol) of 2-methyl-3-acetyl-4,5-pyridinedicarboxylic acid, 10 ml. of 97 percent sulfuric acid and 7 ml. of chloroform, were added in small portions and with stirring, 0.75 g. (0.0115 mol) of sodium azide. The solution was allowed to stand for about 12 hours, and was then poured with stirring over 50 g. of chipped ice. The aqueous solution was heated on a steam path, cooled, and adjusted to pH 2.0 with ammonium hydroxide. On standing, a crystalline precipitate of 2-methyl-3-amino-4,5-pyridine-dicarboxylic acid monohydrate separated, and was filtered off and recrystallized from hot water. The 2-methyl-3-amino-4,5-pyridinedicarboxylic acid monohydrate melted at about 240–242° C.

EXAMPLE 8

Ethyl hydroxymethyleneoxalacetate

The procedure for preparing the ethyl ester of hydroxymethyleneoxalacetate from crude ethyl oxalacetate, the procedure for assaying the ester, and its utilization are as follows:

1260 g. (6 mol) of the commercially available sodium salt of ethyl oxalacetate were stirred into 2 liters of ice-cold 3.5 N hydrochloric acid solution. The mixture was extracted with two 1 liter portions of ether, and the combined ether extracts were dried with anhydrous magnesium sulfate. The ether was removed by evaporation, and the residue of crude ethyl oxalacetate was heated on the steam bath under vacuum (about 2 m. of mercury) for fifteen minutes.

To the crude ethyl oxalacetate were added 1250 g. (8.45 mol) of ethyl orthoformate and 1400 g. (13.7 mol) of acetic anhydride, and the mixture was heated in an oil bath at 140° C. during the heating volatile products were allowed to distill out through a short Vigreaux column. After two hours, the pressure was lowered slightly, and as distillation proceeded, the pressure was progressively lowered until it was reduced to about 2–5 mm. of mercury. Heating at 140° C. was continued until distillation of volatile products ceased. The residual liquid in the flask consisting of crude ethyl ethoxymethyleneoxalacetate was cooled to room temperature, and was mixed with about 1.5 liters of water. Solid, powdered sodium bicarbonate was added in about 10 g. portions with vigorous agitation until carbon dioxide was no longer evolved (about 500 g. of sodium bicarbonate were used). The resulting mixture consisting of an aqueous solution of the sodium salt of ethyl hydroxymethyleneoxalacetate together with water-insoluble, oily impurities was washed with two 500 ml. portions of ether. The aqueous solution was carefully acidified with an excess of cold hydrochloric acid. The oily layer of ethyl hydroxymethyleneoxalacetate which separated was collected, and the aqueous phase was extracted with two 500 ml. portions of ether. The combined ether extract and ethyl hydroxymethyleneoxalacetate were dried with anhydrous magnesium sulfate, and the ether was evaporated. The residual crude ethyl hydroxymethyleneoxalacetate was heated on the steam bath at about 90–95° C. under a reduced pressure of 2–5 mm. of Hg for fifteen minutes. The yield of liquid was about 840 g. and contained about 71 percent of ethyl hydroxymethyleneoxalacetate.

The content of ethyl hydroxymethyleneoxalacetate in the liquid was determined as follows: A 10 g. aliquot was carefully weighed, and shaken with a solution of 5 g. of cupric chloride dihydrate in 100 ml. of water. A blue crystalline precipitate was formed. The precipitate was collected on a filter, and was washed first with petroleum ether, and then with water, and air dried. This blue solid was the copper complex salt of ethyl hydroxymethyleneoxalacetate of the formula: $C_{18}H_{22}O_{12}Cu$. It melted at about 232–233° C. Analysis showed the presence of 43.45 percent carbon, 4.65 percent hydrogen and 12.67 percent copper as compared with the calculated values of 43.77 percent carbon, 4.49 percent hydrogen, and 12.87 percent copper.

The weight of copper salt from 10 g. of the crude product above was 8.4 g. representing 7.06 g. of ethyl hydroxymethyleneoxalacetate as calculated from the above formula, or a content of about 71 percent. To 580 g. of the crude ethyl hydroxymethyleneoxalacetate were added 1400 ml. of dry ethyl acetate and 320 g. of iminoacetylacetone. The mixture was maintained at 10–15° C. for seven hours, and allowed to stand for about 15 hours at room temperature, whereupon a white crystalline precipitate of the ammonium salt of ethyl hydroxymethyleneoxalacetate separated. The precipitate was collected on a filter, was washed with a small amount of ethyl acetate, and dried. The yield was 145 g. It was saved for recovery of ethyl hydroxymethyleneoxalacetate (see Example 9) or for reaction with acetyl acetone to form N - (1 - methyl - 3 - keto - 1 - butenyl) - N - (2',3'-dicarbethoxy-3'-keto-1'-propenyl) amine (see Example 10).

The filtrate which contained N-(1-methyl-3-keto-1-butenyl) - N - (2',3' - dicarbethoxy - 3' - keto - 1'-propenyl) amine was washed with aqueous sodium bicarbonate solution, the bicarbonate layer was separated and the organic layer was evaporated in vacuo on the steam bath to a syrupy, partially crystalline residue. The residue was stirred with 500 ml. of a mixture of equal parts of ether and petroleum ether (B. P. 60–68°), and the mixture was kept in the refrigerator for two days. The crystalline product, N-(1-methyl-3-keto-1-butenyl)-N-(2',3'-dicarbethoxy-3'-keto-1'-propenyl) amine was collected on a filter, washed with a very small amount of ice cold ether and dried in air. The yield was 210 g.

EXAMPLE 9

*Ethyl hydroxymethyleneoxalacetate*

5 g. of the ammonium salt of ethyl hydroxymethyleneoxalacetate (obtained as shown in Examples 3 and 8) were shaken with 20 ml. of 3 N hydrochloric acid. The mixture was extracted with ether and the extract dried with anhydrous magnesium sulfate. After removal of the ether the liquid, ethyl hydroxymethyleneoxalacetate, was recovered by vacuum distillation, the compound boiling at 93–96° C. at a pressure of 1 mm. of Hg. The yield of recovery was 4.1 g. (87 percent).

EXAMPLE 10

*N - (1 - methyl - 3 - keto - 1 - butenyl) - N - (2',3'-dicarbethoxy-3'-keto-1'-propenyl) amine*

A mixture of 11.7 g. (0.05 mol) of the ammonium salt of ethyl hydroxymethyleneoxalacetate (Examples 3 and 8), and 6.0 g. (0.06 mol) of acetyl acetone in 100 ml. of benzene was heated under reflux for two and one-half hours. The solution was evaporated in vacuo with warming to a brown syrup which partially crystallized. The semi-crystalline material was slurried with a small amount of cold, dry ether, and the crystalline N-(1-methyl - 3 - keto - 1 - butenyl) - N - (2',3' - dicarbethoxy-3'-keto-1'-propenyl) amine was collected on a filter and dried in air. The yield was 4.0 g. (27 percent of theory). It was identified by melting point, 123–124° C. and mixed melting point with samples of the amine prepared by the procedures of Examples 3 and 8.

EXAMPLE 11

*2 - methyl - 3 - amino - 4,5 - pyridinedicarboxylic acid*

In a 600 ml. beaker were placed 250 g. of 97 percent sulfuric acid. 75 g. (0.25 mol) of N-(1-methyl-3-keto-1-butenyl) - N - (2',3' - dicarbethoxy - 3' - keto - 1'-propenyl) amine were added in portions with stirring. The temperature was maintained at about 60° C. by occasionally cooling in an ice bath. The mixture was allowed to stand at room temperature for one hour during which time it cooled to about 35° C. 17 g. (0.26 mol) of finely powdered sodium azide were added with stirring at a rate of about 0.5 g. every five minutes. This addition required a total of about 3 hours time. The temperature of the mixture tended to rise gradually but it was maintained at about 42–45° C. by occasional cooling in an ice bath. After all of the sodium azide had been added, the mixture was allowed to stand for about 15 hours. The sulfuric acid solution was then poured over 500 g. of ice. The aqueous solution was heated on the steam bath for 10–15 hours to effect hydrolysis of the intermediate 2 - methyl - 3 - acetylamine - 4,5 - pyridinedicarboxylic acid so as to convert it to 2-methyl-3-amino-4,5-pyridinedicarboxylic acid. Water was added at intervals to maintain the volume of the solution to about 500 ml. After heating, concentrated ammonium hydroxide solution was added to the cool solution until the pH of the solution was brought to about pH 2.0. This required about 330 ml. of 28 percent ammonium hydroxide. The desired 2-methyl-3-amino-4,5-pyridinedicarboxylic acid monohydrate separated slowly, as a crystalline precipitate. The mixture was allowed to stand for several days, and the precipitate was collected on a filter, washed with a little water and dried in air. The yield was 26.6 g. (50 percent of theory). 2-methyl-3-amino-4,5-pyridinedicarboxylic acid monohydrate after recrystallization from water melted with decomposition at about 240–242° C.

I claim:

1. The method of preparing a compound represented by the formula

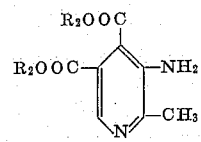

in which $R_2$ is a member of the group consisting of hydrogen and a lower alkyl radical, which comprises reacting a lower alkyl ester of oxalacetic acid with an orthoformic acid lower alkyl ester to produce a lower alkyl ester of an etherified hydroxymethyleneoxalacetic acid, treating said ester sequentially with alkali and acid to produce an ester of hydroxymethyleneoxalacetic acid, reacting the hydroxymethyleneoxalacetic acid ester with iminoacetylacetone to produce a N-(1-methyl-3-keto-1-butenyl)-N-(2',3'-dicarboxy-3'-keto-1'-propenyl) amine ester, cyclizing said ester with sulfuric acid to produce a 2-methyl-3-acetyl-4,5-pyridinedicarboxy compound and reacting said pyridine compound with hydrazoic acid, thereby to convert the 3-acetyl group into a 3-amino group.

2. The method of preparing a N-(1-methyl-3-keto-1-butenyl) - N-(2',3'-dicarboxy-3'-keto-1'-propenyl) amine ester, which comprises reacting a lower alkyl ester of hydroxymethyleneoxalacetic acid with iminoacetylacetone.

3. The method according to claim 2 in which the ester of hydroxymethyleneoxalacetic acid is the ethyl ester.

4. In the method of preparing a compound having the following formula

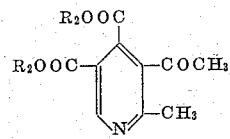

in which $R_2$ is a member of the group consisting of hydrogen and a lower alkyl radical, the step which comprises cyclizing a N-(1-methyl-3-keto-1-butenyl)-N-(2',3'-dicarboxy-3'-keto-1'-propenyl) amine lower alkyl ester with concentrated sulfuric acid.

5. A process according to claim 4 in which the ester is the ethyl ester.

6. In the method of preparing a compound having the formula

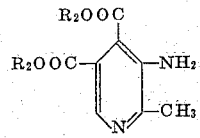

in which $R_2$ is a member of the group consisting of hydrogen and a lower alkyl radical, the step of reacting with hydrazoic acid a compound having the formula

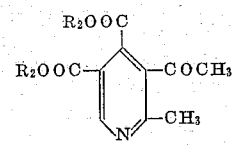

in which $R_2$ has the same significance as before.

7. A process which comprises reacting a lower alkyl ester of oxalacetic acid with an orthoformic acid lower alkyl ester.

8. A process according to claim 7 in which the oxalic acid ester is the ethyl ester.

9. A compound represented by the formula

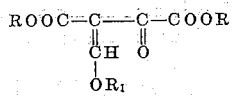

in which R represents a lower alkyl radical, and $R_1$ represents a lower alkyl radical.

10. A compound represented by the formula

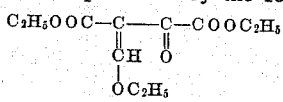

11. A compound represented by the formula

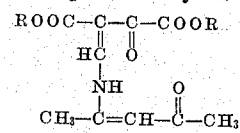

in which R represents a lower alkyl radical.

12. A compound according to claim 11 in which the lower alkyl radical is the ethyl group.

13. A compound represented by the formula

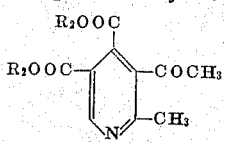

in which $R_2$ represents a member of the group consisting of hydrogen and a lower alkyl radical.

14. A compound represented by the formula

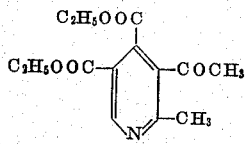

15. A compound represented by the formula

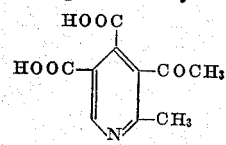

References Cited in the file of this patent

Elderfield, "Heterocyclic Compounds," vol. I, pp. 462–63, Wiley and Sons, N. Y. (1950).

Jones, JACS 73: 3684–86, 4380–83, 5244–47 (1951).